(12) United States Patent
Salvadori

(10) Patent No.: US 12,403,634 B2
(45) Date of Patent: Sep. 2, 2025

(54) METHOD FOR OBTAINING AN OBJECT THROUGH THE USE OF MACHINE TOOLS

(71) Applicant: Fabio Salvadori, Casciana Terme Lari (IT)

(72) Inventor: Fabio Salvadori, Casciana Terme Lari (IT)

(73) Assignee: ALFA HOLDING DI ANNARITA CAPONI E C. S.A.S., Pisa (IT)

( * ) Notice: Subject to any disclaimer, the term of this patent is extended or adjusted under 35 U.S.C. 154(b) by 1005 days.

(21) Appl. No.: 17/251,459

(22) PCT Filed: Jun. 25, 2019

(86) PCT No.: PCT/IB2019/055335
§ 371 (c)(1),
(2) Date: Dec. 11, 2020

(87) PCT Pub. No.: WO2020/003116
PCT Pub. Date: Jan. 2, 2020

(65) Prior Publication Data
US 2021/0252749 A1 Aug. 19, 2021

(30) Foreign Application Priority Data

Jun. 28, 2018 (IT) .......................... 102018000006777

(51) Int. Cl.
*B05D 3/00* (2006.01)
*B29C 41/08* (2006.01)
(Continued)

(52) U.S. Cl.
CPC .............. *B29C 41/08* (2013.01); *B29C 41/22* (2013.01); *B29C 44/367* (2013.01); *B05D 3/00* (2013.01);
(Continued)

(58) Field of Classification Search
CPC ........................................................ B05D 3/00
See application file for complete search history.

(56) References Cited

U.S. PATENT DOCUMENTS 4,775,502 A * 10/1988 Chafvin, Jr. ............. C08J 9/283
521/64
5,247,861 A * 9/1993 Jahn ........................ B21D 37/20
4/597
(Continued)

FOREIGN PATENT DOCUMENTS

| CN | 202139854 | 2/2012 |
| EP | 2346374 | 7/2011 |

(Continued)

OTHER PUBLICATIONS

JP 2001299511 English Translation, (Year: 2000).*
Elastoflex, (Year: 2013).*
Elastolit, (Year: 2017).*

*Primary Examiner* — Gordon Baldwin
*Assistant Examiner* — Mohammad Mayy
(74) *Attorney, Agent, or Firm* — Maschoff Brennan

(57) ABSTRACT

A method for obtaining an object, such as an interior design object or a piece of furniture, includes the steps of producing a base structure of the object, and applying a coating to at least part of the base structure. The step of applying the coating includes distributing, onto the base structure, a material castable in a mold or producing one or more preformed blocks of this castable material in a mold to be joined to the base structure, and subsequently machining the coating using machine tools to generate a final shape.

8 Claims, 6 Drawing Sheets

(51) Int. Cl.
  *B29C 41/22* (2006.01)
  *B29C 44/36* (2006.01)
  B29K 25/00 (2006.01)
  B29K 75/00 (2006.01)
(52) U.S. Cl.
  CPC ...... *B29K 2025/06* (2013.01); *B29K 2075/00* (2013.01)

(56) References Cited

U.S. PATENT DOCUMENTS

| | | | |
|---|---|---|---|
| 2002/0086140 A1* | 7/2002 | Ghahary | B32B 27/00 |
| | | | 428/143 |
| 2007/0267890 A1* | 11/2007 | Cowelchuk | B32B 27/12 |
| | | | 296/146.7 |
| 2008/0203605 A1 | 8/2008 | Pyzik | |
| 2011/0217480 A1* | 9/2011 | Salvadori | B68G 7/02 |
| | | | 427/532 |
| 2015/0038032 A1* | 2/2015 | Pfau | B32B 37/24 |
| | | | 156/62.2 |
| 2015/0204011 A1* | 7/2015 | Lin | D06N 3/0059 |
| | | | 442/147 |

FOREIGN PATENT DOCUMENTS

| | | | |
|---|---|---|---|
| EP | 2599606 | | 6/2013 |
| JP | 2001299511 A | * | 10/2001 |
| WO | 2004096569 | | 11/2004 |

* cited by examiner

METHOD FOR OBTAINING AN OBJECT THROUGH THE USE OF MACHINE TOOLS

TECHNICAL FIELD

The present invention relates to the technical field of objects in general, in particular objects which may belong to the field of furniture or interior design such as chairs, armchairs or similar ones but also to the car field, such as car seats or seats for means of transport in general.

In particular, the invention is directed to an innovative method of production which avoids the process of mold casting, thus enabling a considerable simplification of the process of production.

BRIEF OUTLINE OF THE PRIOR ART

Publication EP2346374 is known, which describes the production of a piece of furniture and interior design through machine tools, starting from a block of polystyrene which is machined through machine tools and the subsequent coating by a polyurethane material, for example by spraying.

In this innovative manner, the object owns high load-bearing features combined with the lightness obtained through the use of a polystyrene "core".

However, it might be necessary to add or realize additional layers, for example a stuffing which generally passes through procedures of completion by foaming in mold of a foamable material or through the manual application of solid parts of foam rubber by gluing.

The step of mold casting is not so easy and first of all it requires the realization of the suitable mold (with the consequent relative times) and a non-simple process of shaping. The quality of the external surface is good but the production in the mold is often expensive and complex as it requires expensive equipment. Furthermore, in order to produce more pieces at the same time, more molds are needed. Finally, the process itself is "rigid" because any changes to the product require the construction of a new mold.

Alternatively, pre-formed foam rubber pieces may be applied by gluing, but in this case, the quality of the final three-dimensional shape is not optimal and in particular the final profile is not optimal.

Many objects in general, for example knick-knacks or pieces of furniture are directly obtained through mold casting.

For example, publication EP2599606 in the name of Caponi Annarita is known which describes the realization of any polystyrene object through a process of casting polystyrene in a mold and the subsequent step of coating by spraying through a polyurethane material which confers structural features to the object.

Even in this case, the subsequent operations for realizing additional layers, such as the foam rubber layer, must be realized by the use of the mold or anyway the application of preformed pieces by gluing is required.

The whole process causes the same inconveniences described above.

SUMMARY OF THE INVENTION

Therefore, the aim of the present invention is to provide an innovative method of production, which resolves said technical disadvantages at least in part.

In particular, the aim of the present invention is to provide a method for obtaining an object in general, for example interior design objects such as armchairs, pieces of furniture, for example chairs, tables, stools, couches, poufs, knick-knacks but also object belonging to the technical field of transport means, such as car seats, etc., which avoids the need of cast molding to have great and precise surface qualities.

These and other aims are achieved through the present method for obtaining an object in general, as described herein.

This method comprises the steps of:
Realization of a base structure (2) of the object.
For example, a base structure of polystyrene coated by rigid polyurethane which confers structural features can be obtained as described in prior art.
According to the invention, a coating is realized through the distribution onto at least a part of said base structure with a material of the type castable in mold.

The material, which can be casted in mold means, in broad manner, any materials which can be casted and formed in mold and therefore, preferably having the feature to pass from a liquid or semi-liquid and doughy state by casting to a solid state after the solidification inside the mold. Even more preferably, but not necessarily, this material is foamable and/or expandable. Foamable means that the fluid state of casting thereof and the consistency thereof is like a foam which expand and solidifies. Expandable means that it simply expands during the solidification, thus increasing in volume.

The process of distribution can preferably occur through methods such as spraying and therefore with no use of the mold. In case of spraying, a single nozzle can be used as well as two or more nozzles which spray at the same time.

Finally, the machining of said coating occurs by machine tools according to a final shape.

In this manner, all the above-mentioned technical inconveniences are readily solved.

In particular, as mentioned, the realization of the coating does not occur in the mold, even using the material castable in the mold, which can be foamable and/or preferably but not necessarily also expandable at the same time. On the contrary, the coating is made through a distribution of said material which can preferably include for example a spraying but also a spreading (for example through a suitable roller or spreading brush), everything with no use of the mold.

After the spraying, for example through suitable nozzles, this material coats the body.

Therefore, a coating can be readily realized with a greater thickness with no need of particular precision and then the coating is polished by machining it through machine tools to remove sliders.

In this way, a complex machining in the mold is avoided, thus obtaining an object with excellent finishing qualities and final shape in a cheap and fast manner.

Advantageously, this procedure also enables blocks of soft material, such as foam rubber, to be applied to predetermined points of the base structure before the distribution of the coating.

Subsequently, therefore, it is possible to distribute, for example by spraying, this material castable in the mold, which is preferably a polyurethane material and in particular, in a preferred embodiment of the invention, a flexible expanded polyurethane.

In an embodiment, this method comprises the steps of:
Realization of a base structure (2) of the object;
Realization of a coating which coats at least in part said base structure, through the realization of one or more preformed blocks of said material castable in the mold and joined, by gluing for example, to said base structure;

According to this embodiment of the invention, also in this case it is provided a subsequent machining of said coating by means of machine tools according to a final shape.

The application of the coating in the form of one or more preformed blocks is equally realizable since, even in this case, high precision is not required and the coating can be much increased in thickness. The subsequent machining through machine tools will determine the exact final shape with great precision.

Even in this case, obviously, it is possible to apply preformed blocks of soft material, for example foam rubber, in advance.

Therefore, in all the variable embodiments, a coating is realized with a foamable material without however using a mold but with alternative methods that can provide spraying or for example gluing one or more preformed solid pieces.

Then the finishing through machine tools occurs.

Advantageously, said step of distribution can occur by spraying through one or more nozzles (60) or, in case of application of one or more preformed blocks, said preformed blocks are glued to the base structure.

Advantageously, said operation of realization of the base structure can comprise a machining of one or more blocks (2) of material through machine tools according to a predetermined shape.

Advantageously, said blocks (2) of material are of polystyrene.

Advantageously, said material castable in the mold is a polyurethane material, in particular it can be a flexible expanded polyurethane or a rigid expanded polyurethane.

Advantageously, in a possible embodiment, said base structure (2, 3) is obtained by machining one or more blocks (2) of material and wherein the following steps are further provided:

Distribution, preferably spraying, of a layer (3) of compact rigid polyurethane material onto said base structure so as to create an intermediate layer suitable for conferring predetermined structural features to the said base structure;

Distribution, preferably spraying, of a flexible expanded polyurethane material (A+B) onto said intermediate layer so as to create said layer having predetermined features of softness and onto which said machining through machine tools occurs according to a final shape.

Advantageously, in a further embodiment, said base structure can be obtained through a machining of one or more blocks of material and in which the following further steps are further provided:

Distribution, preferably spraying, of a layer (3) of compact rigid polyurethane material onto said base structure so as to create an intermediate layer suitable for conferring predetermined structural features to the said base structure;

Application by gluing of one or more preformed blocks (A1, A2) of flexible expanded polyurethane material onto said intermediate layer so as to create said coating having predetermined features of softness and onto which occurs said machining through machine tools according to a final shape.

Advantageously, said base structure can be obtained through a machining of one or more blocks of material and wherein the following further steps are further provided:

Distribution, preferably spraying, of a layer (3) of compact rigid polyurethane material onto said base structure so as to create an intermediate layer suitable for conferring predetermined structural features to the said base structure;

Realization of a coating (400A+400B) onto said intermediate layer, said coating being a polyurethane material of rigid expanded polyurethane type and onto which occurs said machining through machine tools according to a final shape.

Advantageously, said blocks (2) of material are made of polystyrene.

Advantageously, said machining of said blocks of polystyrene can occur through machine tools so as to shape them according to a predetermined shape, for example rotary milling cutter.

Advantageously, the application of one or more preformed blocks (10) in predetermined points of the object can be comprised, said preformed blocks being preferably of flexible expanded polyurethane material.

In a particularly important embodiment of the invention, the method for obtaining an object (1) in general comprises the steps of:

Realization of a base structure (2, 3) of the object, preferably of polystyrene;

Distribution of a first polyurethane material onto at least a part of said base structure so as to create a rigid shell which confers predetermined structural features to the said base structure, said first polyurethane material being a compact rigid polyurethane material.

In case of use of polystyrene, according to these steps, an object is obtained corresponding to what is described in EP2346374.

According to the invention, it is now comprised a step of realization of a coating (A+B; 400A+400B) which coats at least in part said rigid shell, said step of realization of the coating comprising a distribution onto said at least one part of rigid shell of a second type of polyurethane material or, alternatively, the realization of one or more preformed blocks (A1, A2) made of said second type of polyurethane material and joined to said base structure.

This second type of polyurethane material is an expanded polyurethane material which forms an external layer overlapping said rigid shell, said external layer being realized with greater thickness.

Then it is comprised a subsequent machining by means of machine tools of said external layer of expanded polyurethane material so as to bring the object to the final size.

This embodiment solves in a particularly effective manner the technical inconveniences formulated.

In particular, the expanded polyurethane is a different polyurethane with respect to compact rigid polyurethane.

In fact, it has different technical features with respect to compact rigid polyurethane material used for the realization of the said rigid shell, thus being softer and generally less rigid, therefore also fit to realize stuffing.

As described, the structure if realized in polystyrene coated by compact rigid polyurethane enables to obtain light, resistant and cheap structures.

Other light materials can be used for the realization of the core and always strengthened by means of compact rigid polyurethane.

The subsequent stuffing is thus obtained as described, i.e. by applying, for example by spraying, the expanded polyurethane which has different mechanical features than rigid polyurethane with greater features of softness. The same applies in case of application of preformed pieces. In this way, the use of the mold is avoided and by realizing the internal coating with greater thickness, then it is possible to polish it to the size through machine tools, this obtaining a precise machining even if no great precision is required during the productive step of the coating.

Therefore, the method used is fast, cheap and convenient.

The usable expanded polyurethane can be flexible expanded polyurethane or rigid expanded polyurethane.

In the first case, the flexible expanded polyurethane forms foam rubber, having remarkable features of softness, thus enabling to create proper stuffing for chairs, seats, etc.

Instead, rigid expanded polyurethane has greater rigidness, in case of necessity to create more rigid stuffing or coating with respect to foam rubber.

Therefore, the type of selected expanded polyurethane material enables to obtain various degrees of "softness".

BRIEF DESCRIPTION OF THE DRAWINGS

Additional features and advantages of the present method according to the invention will become apparent from the following description of preferred embodiments thereof, given only by way of non-limiting examples, with reference to the attached drawings, wherein.

Figures from 1 to 3 depict the steps of machining according to a first preferred embodiment of the invention.

Both

DESCRIPTION OF SOME PREFERRED EMBODIMENTS

According to the invention, some preferred embodiment of the invention will be described below:
In a First Embodiment of the Invention:

With reference to figures from 1 to 3, in a first possible embodiment of the invention, an object having a "core" 2 made of polystyrene is realized.

"Core" means the central structure and therefore a base structure which can provide one single material or two or more materials coupled to one another.

This base structure can be realized exactly as described in the previous publication EP2346374 by means of a machining through machine tools but mold casting is also possible.

As described in previous publication EP2346374, one or more polystyrene blocks can be machined by machine tools, among them numerical control machines such as milling machines or hot-wire cutting machines.

The final form of the object can be obtained from a single block 2 of polystyrene which is processed through one or more machine tools according to the final shape, or the final shape can be obtained by assembling different parts of polystyrene blocks processed according to specific shapes which, joined to one another, enable to obtain the final shape.

The same occurs in case of realization of the polystyrene "core" through the mold in which it can be constituted by two or more parts joined to one another subsequently.

Then polyurethane material (or other materials which can be casted in mold) is distributed onto the surface of this structure realized, for example according to what has been described in previous publication EP2346374 or EP2599606 in which, for example by spraying, this polyurethane material is distributed in order to create a coating with predetermined mechanical features.

This polyurethane material is preferably a compact rigid polyurethane material (coating).

In this way, the base structure becomes a whole with the layer of polyurethane material 3 thus creating a particularly resistant base structure (2, 3) to bear loadings.

The polyurethane which is sprayed to obtain the shell 3 and therefore confer sturdiness to the overall base structure (2, 3) is of the type compact rigid polyurethane material, such as brand BASF, better described below.

This compact rigid polyurethane material, known per se within the prior art and available on the market with other brand names, while solidifying, creates a rigid shell with high mechanical performances. For this reason, it is described as compact rigid polyurethane material. For example, if is sprayed onto a chair made of polystyrene, then the chair can bear a person's weight.

A stuffing of soft material such as foam rubber may be applied onto this base structure (2, 3) if necessary.

Foam rubber is known as flexible expanded polyurethane material. It is different from compact rigid polyurethane material described above since flexible foam material is particularly deformable (it forms soft stuffing) while the other one is highly rigid and creates structural coating shells.

Figure 3:
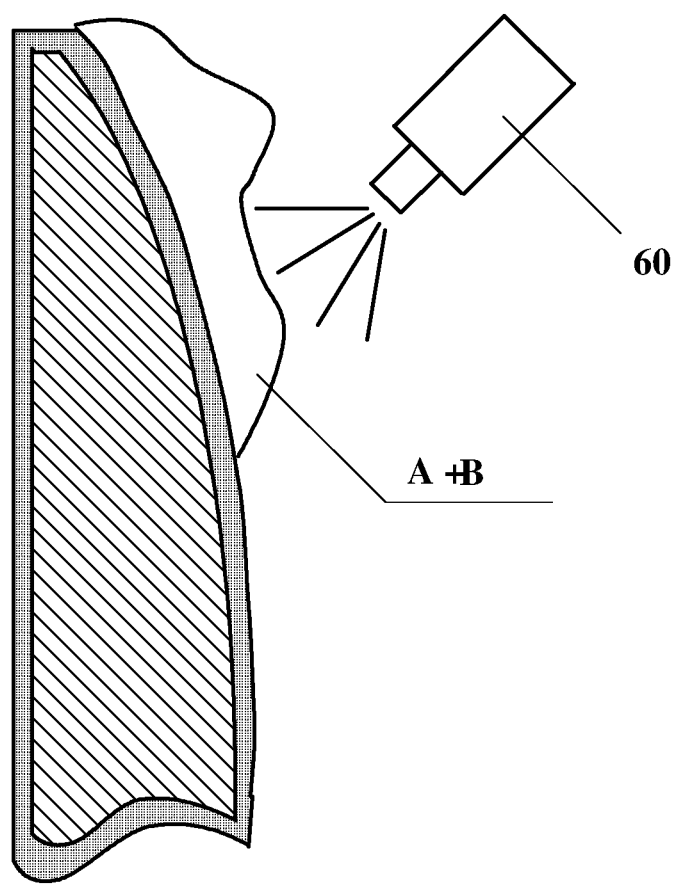

According to the invention, as per FIG. 3, this flexible expanded polyurethane is distributed preferably through a spraying process, thus avoiding the step of mold casting. A suitable nozzle 60 sprays along the surface so as to obtain this foam coating (A+B) depicted in FIG. 3 in the step of completion and marked as completed in FIG. 1.

Figure 1:
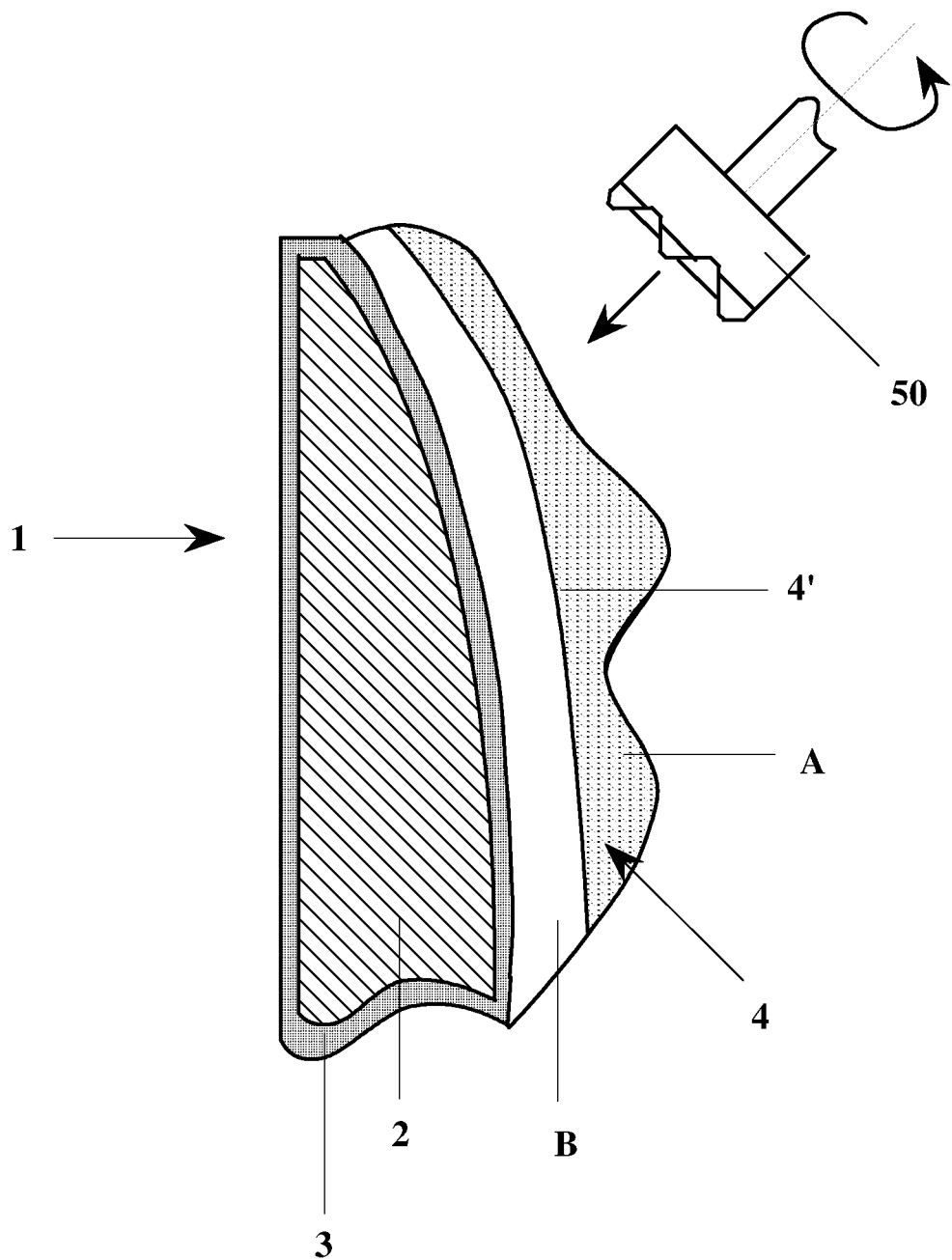

Indeed, FIG. 1 depicts with letters A and B the coating area realized and, as described below, the part A is to be removed in the subsequent step of machining through machine tools.

This flexible polyurethane which is sprayed is generally named flexible expanded polyurethane. Once sprayed, it expands and generates the soft coating.

Therefore, it will have high features of softness and deformability.

As it is inferable from FIG. 1, this external layer of flexible expanded polyurethane creates an oversized thickness and therefore it is not necessary any precision of machining during spraying, thus making this step particularly simple.

According to the invention, in order to shape the stuffing realized according to a required shape, a further step of machining through the above-mentioned machine tools is provided on the side of stuffing, which enables obtaining the final shape.

Figure 2:
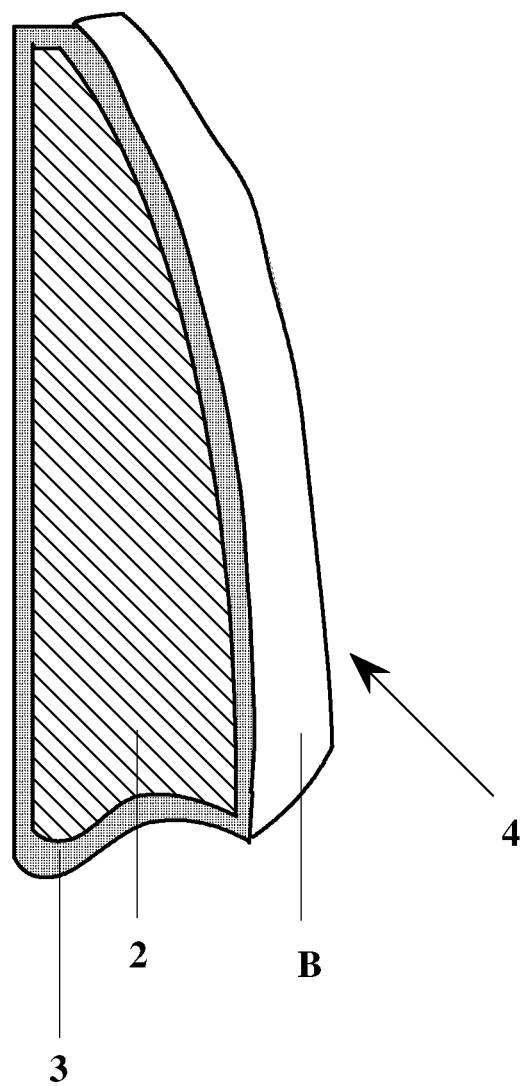

The same FIG. 1 depicts, by way of example, a rotary tool such as a milling cutter 50 which can be arranged in contact with this coating while it rotates at a predetermined speed in order to remove the part A and obtain the final shape B depicted in FIG. 2.

Therefore, the object can be fastened to a support of the machine with the arm mounting the milling cutter which is maneuvered according to a predetermined run and electronically programmable, substantially in similar manner to the well-known CNC machines.

In this manner, it is not necessary anymore to cast the stuffing in the mold through foamable material but, after the spraying, the foam material is machined through machine tools to shape it according to a final shape.

Therefore, it will be possible to spray roughly, thus creating a less accurate but greater thickness and then obtaining the precise final shape after machining through machine tools, for example a milling through one or more milling cutter which can for example run at the same time.

In a second embodiment of the invention:

Without prejudice to what has been described in the first embodiment of the invention, the stuffing could be applied manually, that is by gluing preformed pieces of stuffing according to a scheme known in prior art.

Exactly as described above, the material of the stuffing will always be flexible expanded polyurethane of foam rubber type, for example, which is pre-shaped in block, cut into pieces and then applied onto the object.

Figure 4:
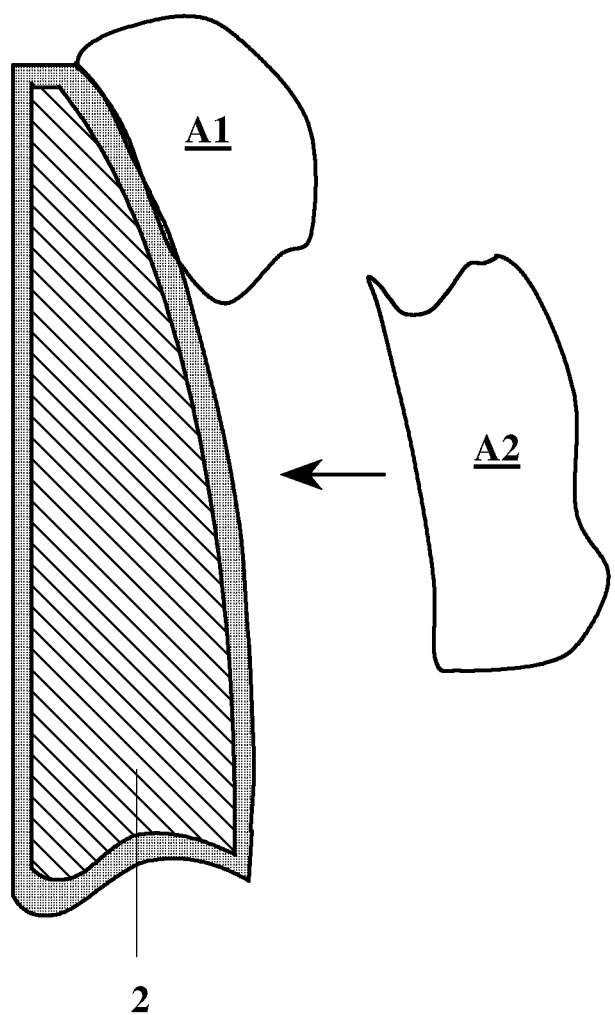
FIG. 4 depicts a second preferred embodiment of the invention.

FIG. 4 depicts preformed blocks A1, A2 which can be glued so as to create this coating which is subsequently machined through machine tools according to a final shape, exactly as described above.

Therefore, in this case too, it is not necessary to apply pieces with a precise shape, as the exact final shape is obtained by machining through machine tools, exactly as described in the first embodiment.

Figure 5A:
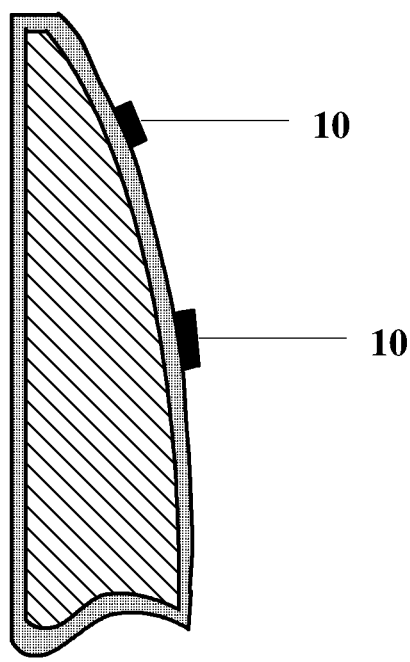
FIGS. 5A and 5B depict a third preferred embodiment of the invention.
Figure 5B:
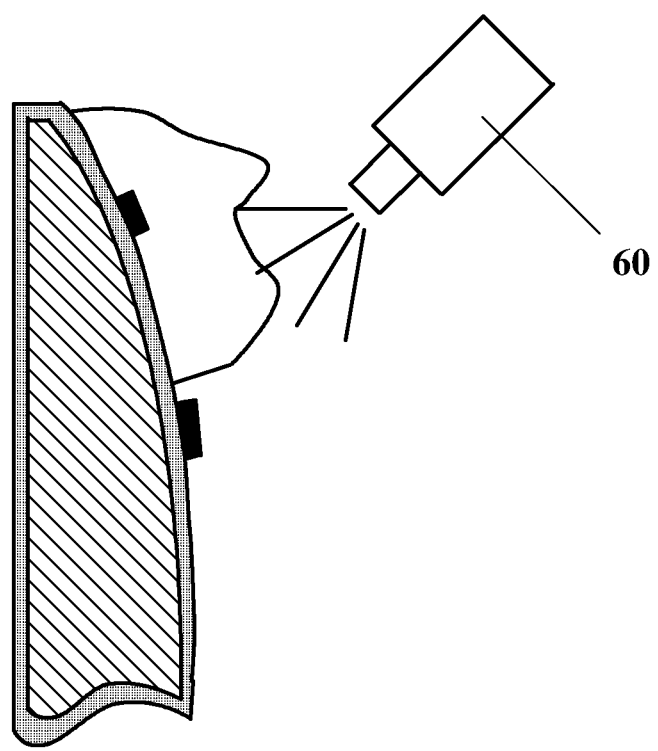

In a third embodiment of the invention:

This third embodiment is identical to the previous ones in many respects and is described in FIGS. 5A and 5B.

With reference to FIG. 5A, a basic structure is realized which comprises, as for the other embodiments described, a block preferably made of polystyrene and preferably machined on machine tools (including also the hot wire for all the embodiments relative to polystyrene) which, exactly as described in the first and second embodiments, is coated with a reinforcing coating made of a compact rigid polyurethane material which can be sprayed.

Subsequently, before the flexible polyurethane spray foam is applied by spraying, pre-formed blocks 10 are applied, preferably made of soft material such as rubber or the foam rubber itself.

Therefore, a certain number of pre-formed blocks can be stored in warehouse, which can further be cut to size and arranged in the structure in selected points, for example by gluing. They have the feature of improving the comfort performance of the final product as they enable to modulate the overall compressive strength of the product and therefore to obtain the desired degree of comfort.

Then, as per FIG. 5B, the flexible spray polyurethane as described above is sprayed through a nozzle 60, and the subsequent machining through machine tools as described above occurs.

In an embodiment, obviously, spraying can be substituted with the gluing of prefabricated blocks of rubber foam as depicted in FIG. 4.

In a fourth embodiment of the invention:

In this case, without prejudice to everything previously described, the same method can be applied to structural "cores" not necessarily made of polystyrene and possibly coated with a structural polyurethane.

In this case, therefore, the machining through machine tools could be omitted if this basic structural material is not machinable through machine tools but is obtained through different machining processes (for example in molds for plastic materials or in tube bending machines for metal materials).

Therefore, a process of coating with the structural polyurethane might not be necessary to confer structural rigidity, i.e. the compact rigid polyurethane.

In this case the operation of applying the stuffing can occur, as described above, by spraying or by gluing pre-formed pieces directly onto the "core" or onto the core coated with polyurethane and with a core that is a different material than polystyrene.

The coating is always flexible expanded polyurethane.

Subsequently, exactly as said above for the embodiments already described, this stuffing is machined through machine tools so as to shape it according to the final desired shape.

According to this embodiment of the invention too, blocks 10 can be applied before spraying or in any case applying foam rubber, as depicted in FIG. 5A.

FIFTH EMBODIMENT OF THE INVENTION

Figure 6:
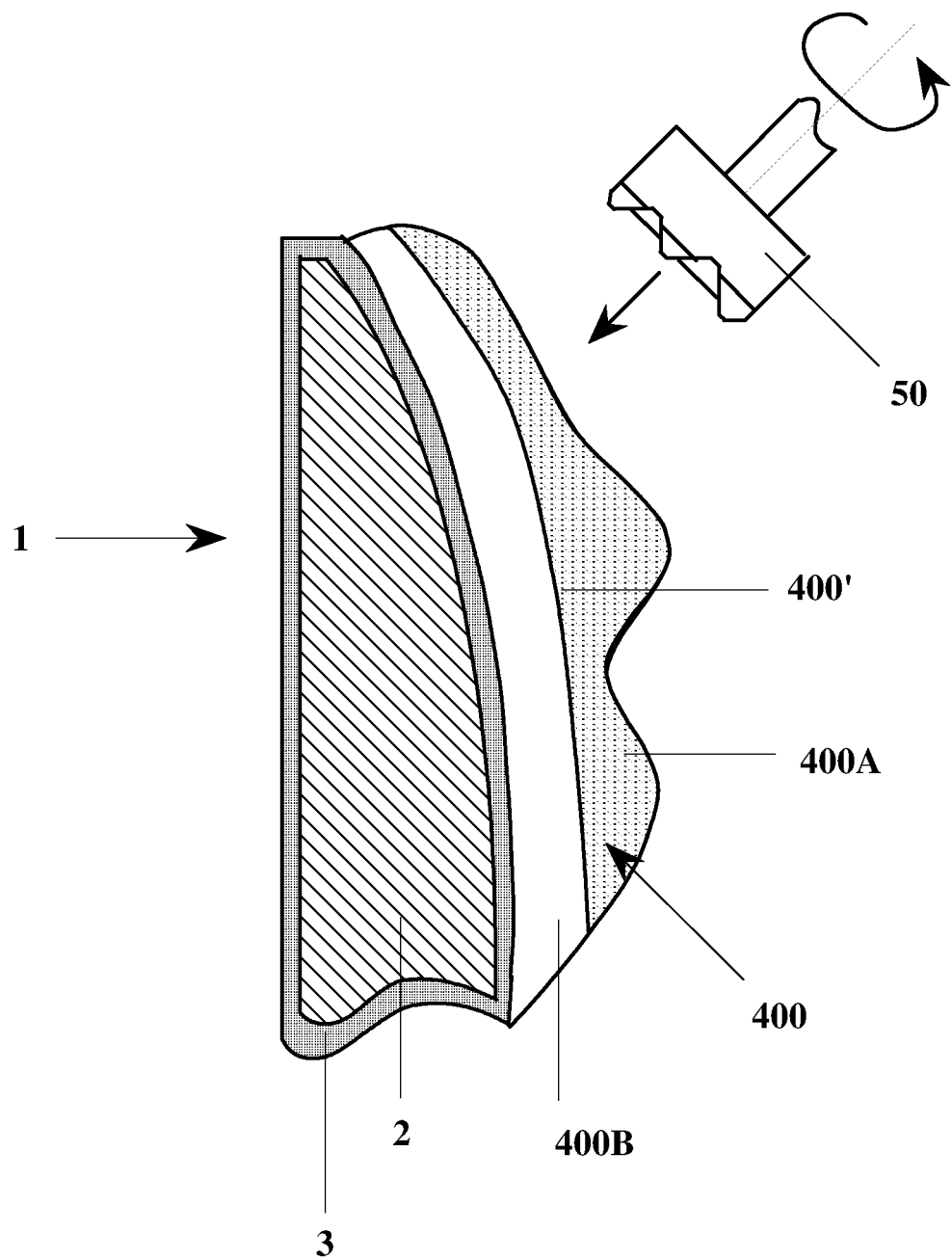
FIG. 6 depicts a further embodiment of the invention.

In this case, as depicted in FIG. 6 and without prejudice to what has been previously described, the difference consists in the external polyurethane which is distributed, for example sprayed, and which is not foam rubber but rather a bit more rigid polyurethane known as rigid spray expanded polyurethane.

It is placed at a level of intermediate rigidity between the compact rigid polyurethane and the flexible expanded polyurethane.

It is then machined through machine tools.

FIG. 6 depicts the preferred embodiment which is applied to the polystyrene core, preferably machined through machine tools, and then coated with the structural polyurethane, i.e. the said compact rigid polyurethane.

In this sense, therefore, a basic structure is made, preferably made of polystyrene but also of other materials, and is coated, if necessary, with a polyurethane material through a spraying process with a compact rigid structural polyurethane material.

The coating is then applied, for example by spraying said rigid expanded polyurethane, and the machining of the external final structure is performed through the machine tools.

Therefore, as also for the other embodiments I-II-III described, an overlapping of a layer of expanded polyurethane is obtained over the shell made of compact polyurethane, whereby having two overlapping polyurethanes with different mechanical features. In this case the rigid expanded polyurethane will have a feature of greater hardness than flexible expanded polyurethane of the I and II configuration, enabling the realization of more rigid coatings/stuffing than foam rubber.

In all the embodiments of invention described, the layer of polyurethane material which is worked through machine tools can therefore have degrees of rigidity ranging from soft (flexible polyurethane) to values of rigidity gradually increasing with a rigid expanded polyurethane.

The mechanical features of polyurethane can easily be selected on the basis of the specific need in order to find the most suitable polyurethane on the market.

The polyurethanes described and preferably used are therefore:

The compact rigid polyurethane material generally used for structural purposes, that is to give structural features to the product in accordance with prior art;

The flexible expanded polyurethane material (also called foam rubber) obviously having different degrees of flexibility and softness depending on the formulation;

The rigid expanded polyurethane that is halfway between the compact rigid one and the flexible one well known on the market.

These last two are generally the coatings that are machined through machine tools and not machined and casted in a mold.

The flexible expanded polyurethane can be for example of the type: Polyol BASF® Elastoflex® W5165/113/FL, Isocyanate BASF® ISO 135/46, produced by BASF®.

The compact rigid polyurethane can be of the type for example: BASF® Polyol Elastocoat® C 6315/138, BASF® Isocyanate ISO 136/34, produced by BASF®;

The rigid expanded polyurethane can be for example of the Elastolit® type always of BASF, for example ELASTOLIT® D81 and ELASTOLIT® D82, therefore with different degrees of rigidity.

All the aforementioned polyurethanes are produced by BASF and their technical features, both of the flexible one and of the rigid one for example Elastolit®, are available on the Internet in their official websites and relative catalogs, for example on the website:

http://www.polyurethanes.basf.de/pu/solutions/en_GB/content/productbrand/cosypur The present method enables to obtain objects of any shape, such as interior design objects and/or pieces of furniture, but also objects in the automotive sector or transport means in general, such as seats for a motor vehicle.

The invention claimed is:

1. A method for obtaining an object comprising the steps of:
   producing a base structure of the object;
   creating a compact rigid shell onto at least a part of said base structure said compact rigid shell conferring predetermined structural features to said base structure, said compact rigid shell obtained by spraying a first polyurethane material onto at least a part of said base structures;
   providing a coating by spraying onto said at least part of said rigid shell, a second type of polyurethane material, said second type of polyurethane material being an expanded polyurethane material which forms an external layer overlapping said rigid shell, said external layer being produced with an increased thickness; and
   subsequently machining, said external layer of expanded polyurethane material using a machine tool so as to remove said increased thickness and to bring the object to a final size.

2. The method, according to claim 1, wherein said base structure is made of polystyrene.

3. The method, according to claim 1, wherein said expanded polyurethane material is a flexible expanded polyurethane material so as to create said coating with predetermined features of softness.

4. The method, according to claim 1, wherein said second type of polyurethane material is a rigid expanded polyurethane material.

5. The method, according to claim 1, wherein spraying, onto said at least part of said rigid shell, the second type of polyurethane material comprises spraying through one or more nozzles.

6. The method, according claim 1, wherein producing the base structure comprises machining of one or more blocks of polystyrene using machine tools according to a predetermined shape.

7. The method, according to claim 1, wherein producing the base structure comprises mold casting.

8. The method, according to claim 1, wherein said object is an interior design object and/or a piece of furniture.

* * * * *